United States Patent [19]

Hattori et al.

[11] 4,201,163
[45] May 6, 1980

[54] IGNITION SYSTEM FOR INTERNAL COMBUSTION ENGINE

[75] Inventors: Tadashi Hattori; Minoru Nishida; Yoshiki Ueno, all of Okazaki; Kunio Makita, Chiryu; Masaaki Kurii, Kasugai, all of Japan

[73] Assignees: Nippondenso Co., Ltd., Kariya; Nippon Soken, Inc., Nishio, both of Japan

[21] Appl. No.: 756,272

[22] Filed: Jan. 3, 1977

[30] Foreign Application Priority Data

Jan. 12, 1976 [JP] Japan .................................. 51-2544

[51] Int. Cl.² ............................................. F02P 5/04
[52] U.S. Cl. ............................................. 123/117 R
[58] Field of Search ................ 123/117 R, 148 B; 315/209 T

[56] References Cited
U.S. PATENT DOCUMENTS

| | | | |
|---|---|---|---|
| 3,811,420 | 5/1974 | Vogel | 123/117 R |
| 3,854,465 | 12/1974 | Adams | 123/117 R |
| 3,890,944 | 6/1975 | Werner et al. | 123/117 R |
| 3,938,485 | 2/1976 | Yoshizu et al. | 123/117 R |
| 3,943,896 | 3/1974 | Green et al. | 123/117 R |
| 3,989,024 | 11/1976 | Lai et al. | 123/117 R |
| 4,020,807 | 5/1977 | Del Zotto et al. | 123/117 R |
| 4,041,912 | 8/1977 | Sessions | 123/117 R |
| 4,125,097 | 10/1978 | Gunderson | 123/117 R |

Primary Examiner—Samuel W. Engle
Assistant Examiner—S. A. Cangialosi
Attorney, Agent, or Firm—Cushman, Darby & Cushman

[57] ABSTRACT

The angle through which the crankshaft of an engine rotates within any given time is proportional to the rotational speed of the engine. Consequently, where the ignition system is of the type in which the integrated value of an integrator circuit or the count value of a counter circuit is varied so as to control the spark advance, if the rate of increase or decrease of the integrated value or the count value within a portion of the increasing or decreasing time is made different from that within the remaining portion of the time, the integrated value or the count value is directly affected by the engine rotational speed. In other words, the spark advance is directly controlled by the factor of the engine rotational speed, thus ensuring satisfactory response characteristic and accuracy for the ignition system.

4 Claims, 19 Drawing Figures

4,201,163

IGNITION SYSTEM FOR INTERNAL COMBUSTION ENGINE

FIELD OF THE INVENTION

The present invention relates to an electronically controlled ignition system for an internal combustion engine, wherein the spark advance is controlled by utilizing increase and decrease of the integrated value of integrating means, and more particularly the invention relates to such ignition system having an improved spark advance control structure in which the rate of change of the variations of the integrated value is made a direct function of the engine speed, thereby ensuring greater response speed and accuracy.

DESCRIPTION OF THE PRIOR ART

Figure 1:
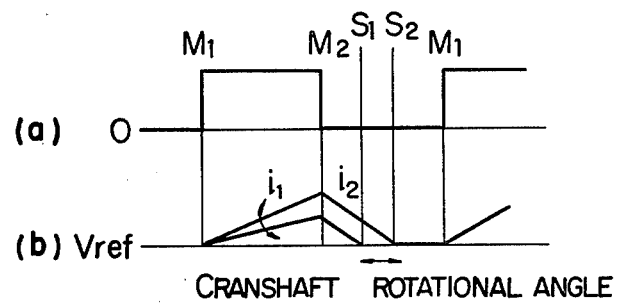
FIG. 1 is a time chart useful for explaining the operation of a prior art system.

An ignition system designed to electronically control the ignition timing is known in the art in which as shown in (a) and (b) of FIG. 1, the charging of a capacitor is started at a reference angular position $M_1$ of an internal combustion engine and the capacitor is caused to start discharging at a point $M_2$, thus changing the ignition timing to a point $S_1$ or $S_2$ or the point of termination of the discharge. In this case, assuming that $i_1$ represents the charging current and $i_2$ represents the discharging current, the ignition timing may be controlled by fixing $i_2$ and varying $i_1$ in accordance with the operation conditions of the engine.

Figure 2:
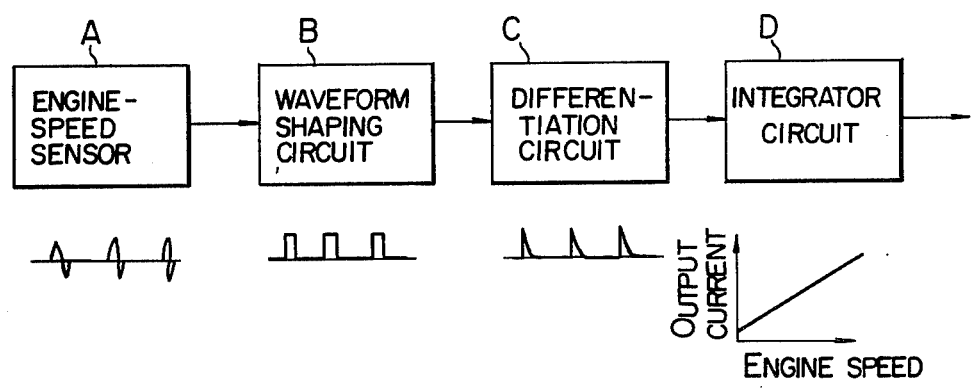
FIG. 2 is a block diagram showing an embodiment of the engine speed circuit used in the prior art system shown in FIG. 1.

An important disadvantage of this type of conventional system is that where either the charging current or the discharging current is varied in accordance with any engine parameter, particularly the engine speed, as shown in FIG. 2, the engine speed is detected by an engine-speed sensor A comprising for example an electromagnetic pickup, converted into a differentiated pulse through a waveform shaping circuit B and a differentiation circuit C and then integrated by an integrator circuit D comprising a capacitor circuit to produce a voltage or current proportional to the engine speed and thereby vary the charging current $i_1$ or the discharging current $i_2$, with the result that the output signal of the final stage integrator circuit D is inevitably delayed with respect to the output signal of the engine-speed sensor A and consequently the control of the ignition timing cannot follow up or respond to changes in the engine rotational speed when the engine is accelerated from the low speed range to the high speed range or decelerated from the high speed range to the low speed range.

SUMMARY OF THE INVENTION

It is the object of the present invention to provide an ignition system for an internal combustion engine whereby when controlling the ignition timing in accordance with increase and decrease of the integrated value of integrating means, one or the other of the positive-going integration time and the negative-going integration time of the integrating means is divided into a predetermined time portion representing the angle of crankshaft rotation proportional to the engine speed and the remaining time portion and the rate of increase or decrease of the integrated value in each of the two time portions is differed from each other, thus rapidly responding to changes in the engine speed and thereby controlling the ignition timing with a high degree of accuracy.

DESCRIPTION OF THE PREFERRED EMBODIMENTS

Figure 3:
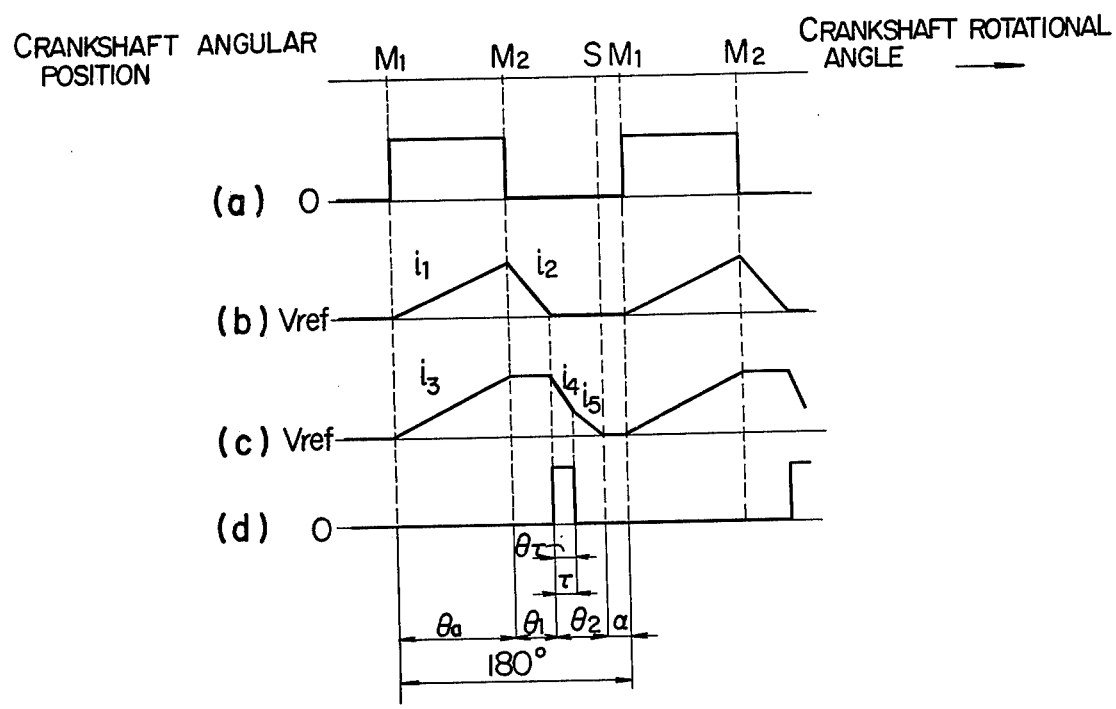
FIG. 3 is a time chart useful for explaining the operation of a system according to the invention.

The principle of the present invention will now be described with reference to the time chart of FIG. 3 showing a plurality of waveforms illustrating the operation of an ignition system according to the invention. First and second angular positions $M_1$ and $M_2$ of the engine crankshaft are detected for each cylinder of the engine, so that as shown in (b) of FIG. 3, a first capacitor in a first computing circuit is charged at a charging current $i_1$ starting at the point of the first angular position $M_1$ and the charging of this capacitor is stopped at the point of the second angular position $M_2$ simultaneously causing it to start discharging at a discharging current $i_2$. In the like manner, as shown in (c) of FIG. 3, a second capacitor in a second computing circuit is charged at a charging current $i_3$ starting at the first angular position $M_1$ and the charging of this second capacitor is stopped at the point of the second angular position $M_2$, after which the terminal voltage of the second capacitor is maintained constant and its discharging is started at a discharging current $i_4$ at the termination point of the discharge in the first computing circuit. At the expiration of a predetermined time $\tau$ after the discharging of the second capacitor has been started, the discharging current is switched from $i_4$ to $i_5$ to continue the discharging and the time that the discharging is completed is selected as the desired ignition point S. Assuming now that the engine is a four-cylinder, four-cycle internal combustion engine, if the angle of crankshaft rotation from the angular position $M_1$ to the next angular position $M_1$ is selected 180 degrees, $\theta_a$ represents the angle of crankshaft rotation between the angular positions $M_1$ and $M_2$, $\theta_1$ represents the angle of crankshaft rotation corresponding to the discharging time of the first computing circuit, $\theta_2$ represents the angle of crankshaft rotation corresponding to the discharging time of the second computing circuit, $\theta_\tau$ represents the angle of crankshaft rotation during the predetermined time $\tau$, the first angular position $M_1$ corresponds to the top dead center at the end of the compression stroke of each cylinder, S represents the ignition point, and $\alpha$ represents the angle of crankshaft rotation between the positions $S_1$ and $M_1$ or the spark advance angle, the following relation holds between $\theta\tau$ and $\tau$.

$$\theta\tau/360 = \tau/(60/n)$$

and therefore $$\theta\tau = \tau \times (n/60) \times 360 = 60 \cdot \tau \cdot n$$

where n is the engine rotational speed in rpm.

Then, the advance angle $\alpha$ can be computed as follows.

(I) When $\theta_2 > \theta\tau$ $$i_1 \cdot \theta_a = i_2 \cdot \theta_1$$

and therefore $$\theta_1 = (i_1/i_2) \cdot \theta_a \qquad (1)$$

$$\theta\tau = 60 \cdot \tau \cdot n \qquad (2)$$

also $$i_3 \cdot \theta_a = i_4 \cdot \theta\tau + i_5 \cdot (\theta_2 - \theta\tau)$$

$$\therefore \theta_2 = (i_3/i_5) \cdot \theta_a - (i_4/i_5)\theta\tau \qquad (3)$$

Therefore, from the above equations (1), (2) and (3), we obtain $$\alpha = 180° - (\theta_a + \theta_1 + \theta_2) \qquad (4)$$

$$180° - (1 + \frac{i_1}{i_2} + \frac{i_3}{i_5})\theta_a + (\frac{i_4}{i_5} - 1) \cdot 60 \cdot \tau \cdot n$$

(II) When $\theta_2 \leq \theta\tau$ $$\theta_2 = (i_3/i_4) \cdot \theta_a$$

$$\therefore \alpha = 180° - (1 + \frac{i_1}{i_2} + \frac{i_3}{i_4}) \cdot \theta_a \qquad (5)$$

Consequently, the spark advance angle $\alpha$ can be represented in terms of the sum of the characteristics of the first and second computing circuits, so that if the charging and discharging currents of the first computing circuit are changed according to any parameter other than the engine speed, such as, intake pressure or cooling water temperature and the charging and discharging currents of the second computing circuit are predetermined, when $\theta_2 > \theta\tau$ in accordance with the engine speed, the spark advance characteristic according to the equation (4) is obtained, whereas when $\theta_2 \leq \theta\tau$, the spark advance characteristic according to the equation (5) is obtained. However, since, in the case of the spark advance characteristic according to the equation (4), the spark advance angle will be changed and the spark timing will be switched to a retarded condition as the engine rotational speed comes into the low-speed range, when the total sum of the spark advances provided by the first and second computing circuits becomes smaller than the minimum angle of spark advance, any further change in the total angle of spark advance is forcibly inhibited to maintain it at a fixed advance angle of a predetermined value.

The present invention will now be described in greater detail with reference to the illustrated embodiments.

Figure 4:
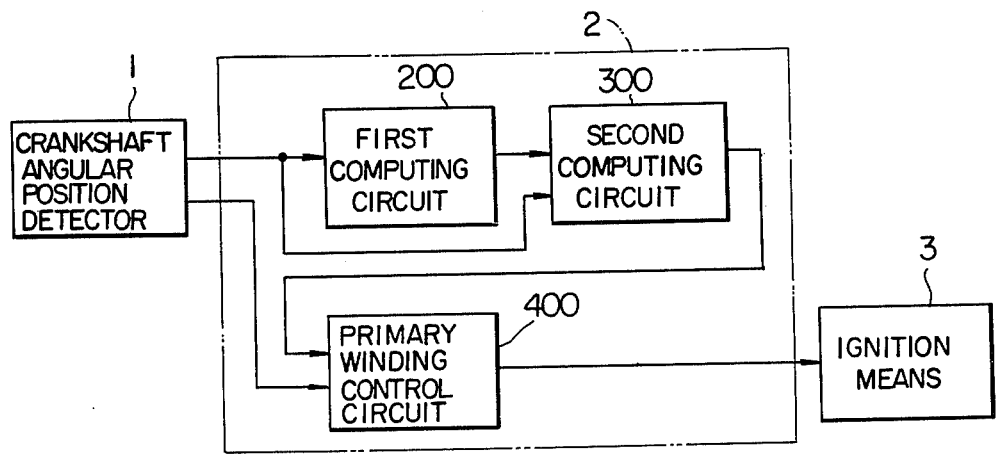
FIG. 4 is a block diagram showing an embodiment of the system according to the invention.

Referring first to FIG. 4 illustrating a block diagram for an embodiment of the present invention, numeral 1 designates a crankshaft angular position detector for detecting two angular positions of the crankshaft of a four-cylinder, four-cycle internal combusting engine, 2 an ignition timing computing circuit, 200 a first computing circuit wherein a first capacitor is charged and discharged in accordance with a signal corresponding to an engine condition other than the engine speed and the signals from the crankshaft angular position detector 1 to thereby compute a spark advance angle, and in this embodiment this engine condition signal is an intake negative pressure signal. Numeral 300 designates a second computing circuit which is responsive to the output signals of the crankshaft angular position detector 1 and the first computing circuit 200 to charge and discharge a second capacitor and thereby compute a spark advance angle in relation to the engine speed. Numeral 400 designates a primary winding control circuit for controlling an ignition coil primary winding in accordance with the output signals of the crankshaft angular position detector 1 and the second computing circuit 300, 3 ignition means for switching on and off the flow of current in the ignition coil primary winding in accordance with the output signal of the primary winding control circuit and thereby causing spark plugs to produce spark in response to the interruption of the current flow in the primary winding.

Next, a detailed circuitry of the system of this invention constructed as described above, will be described with reference to FIG. 5. In the ignition timing computing circuit 2, a reference potential $V_{ref}$ is produced by resistors 2-1 and 2-2 and a capacitor 2-3 and it is coupled through bias resistors to operational amplifiers which will be described later. The first computing circuit 200 comprises a NOT circuit 201, a charge/discharge control circuit 202, analog switches 203, 204 and 209 each being adapted to be turned on in response to a "1" level signal, a charge resistor 205, a discharge resistor 206, bias resistors 207 and 212 connected to the reference potential $V_{ref}$, an input resistor 211, differential amplifiers 208 and 213, a capacitor 210 and an AND circuit 214. The resistors 205, 206 and 207, the capacitor 210 and the differential amplifier 208 constitute a Miller integrator circuit whereby when the input voltage is lower than the reference potential $V_{ref}$, the capacitor 210 is charged, whereas when the input voltage is higher than the referential potential $V_{ref}$ it is discharged. On the other hand, the resistors 211 and 212 and the differential amplifier 213 constitute a comparison circuit. The second computing circuit 300 comprises a charge control circuit including resistors 301 and 303 and a capacitor 302, a first discharge control circuit including resistors 304 and 306 and a capacitor 305, a second discharge control circuit including resistors 307 and 309 and a capacitor 308, analog switches 310, 312, 314 and 318 each being adapted to be turned on in response to a "1" level signal, a charge resistor 311, discharge resistors 313 and 315, bias resistors 316 and 323 connected to the reference potential $V_{ref}$, an input resistor 322, a capacitor 319, differential amplifiers 317 and 324, a first monostable circuit including a NOT circuit 327, a resistor 328, a capacitor 329 and an AND circuit 330, a second monostable circuit including a NOT circuit 331, a resistor 332, a capacitor 333 and an AND circuit 334, AND circuits 321 and 335, an OR circuit 320, a NOT circuit 325, and a NAND circuit 326. The output voltage of the charge control circuit is set to a predetermined divided voltage which is lower than the reference potential $V_{ref}$, and the output voltage of each of the discharge control circuits is set to a predetermined divided voltage higher than the reference potential $V_{ref}$. The first and second monostable circuits each comprises a monostable circuit designed so that when its output goes from the "0" level to the "1" level, the output remains at the "1" level for a predetermined time. The primary winding control circuit 400 has its input connected to the output of the second computing circuit 300, and it comprises resistors 401 and 403, a switching circuit consisting of an NPN transistor 402, a differentiation circuit including a capacitor 404, a resistor 405 and a diode 406, a flip-flop circuit including NAND circuits 407 and 408 and adapted to receive as its inputs and outputs of the differentiation circuit and the angular position detector 1, and an output circuit including resistors 409 and 411, NPN transistors 410 and 412 and a Zener diode 413. The output of the output circuit is connected to the primary winding of an ignition coil 3-1 of the ignition means 3 comprising the ignition coil 3-1, a distributor 3-2 and spark plugs 3-3, 3-4, 3-5 and 3-6 which are mounted in the respective cylinders of the engine, whereby when the primary winding is disconnected from the ground, a spark is produced at each of the spark plugs 3-3 to 3-6. Numeral 7 designates a key switch, 8 a power source battery.

Figure 5:
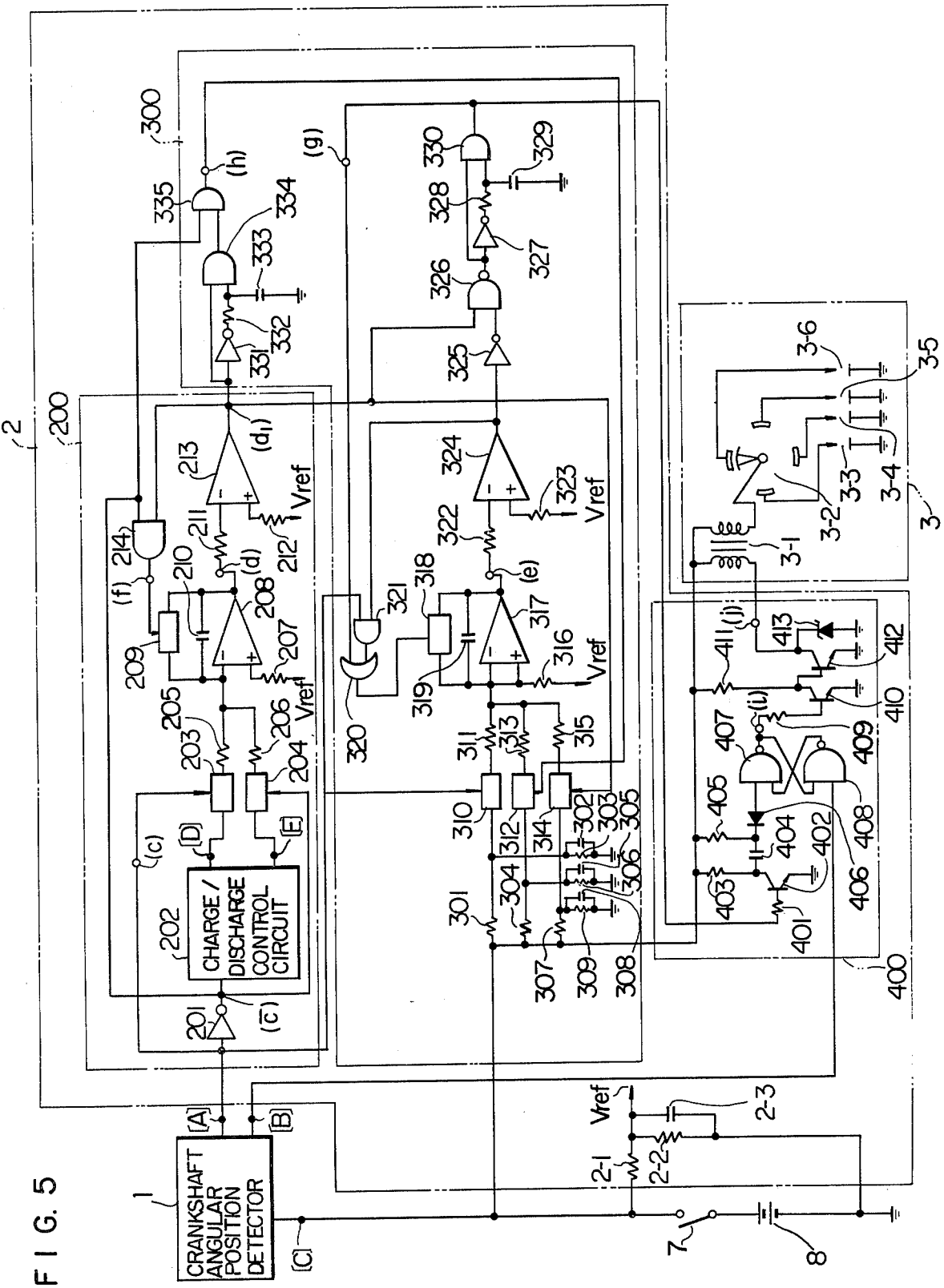
FIGS. 5 and 6 are wiring diagrams showing a detailed circuitry of the system shown in FIG. 4.
Figure 6:
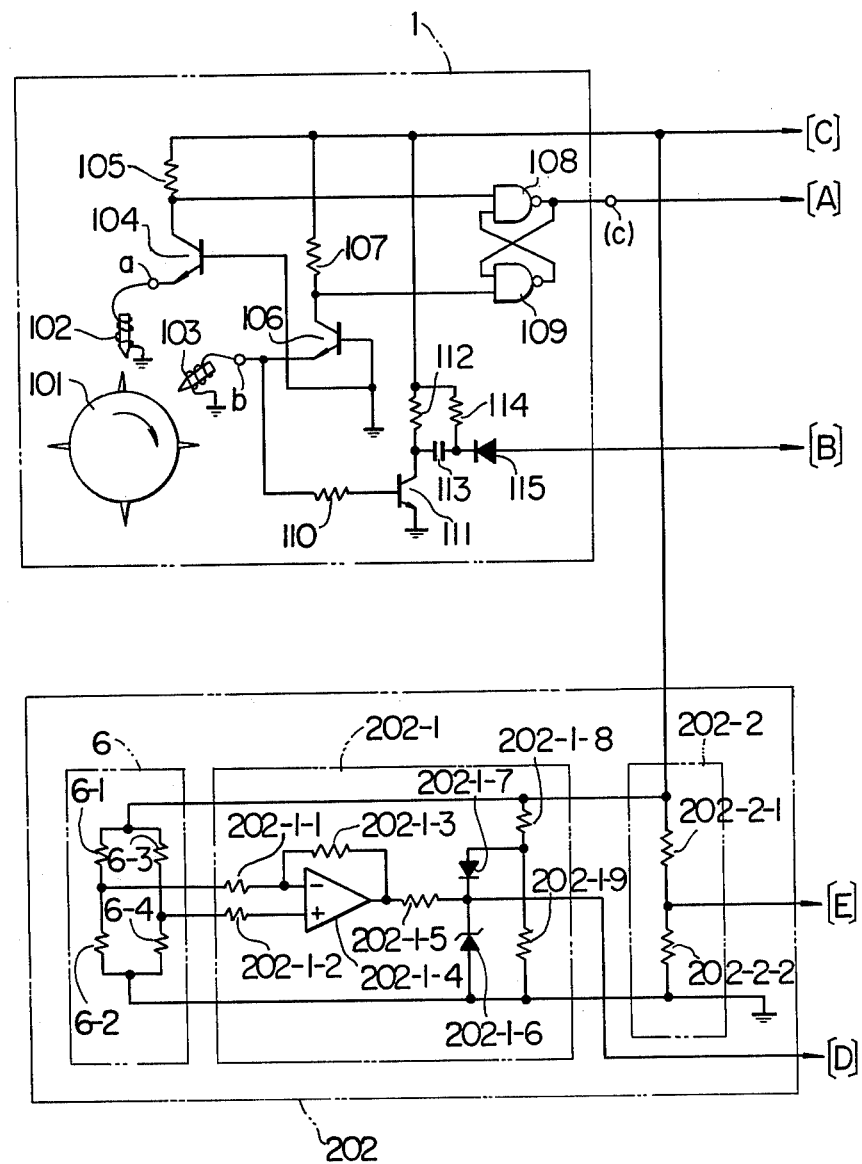

A detailed circuitry of the angular position detector 1 and the charge/discharge control circuit 202 which are shown in the form of a black fox in FIG. 5 will now be described with reference to FIG. 6. In the Figure, terminals [A], [B], [C], [D] and [E] correspond to the terminals [A], [B], [C], [D] and [E] shown in FIG. 5.

Firstly, in the angular position detector 1, numeral 101 designates a rotor which is provided with four projections formed on its outer periphery at equal internals and fixedly mounted on the distributor shaft of the engine which is not shown for rotation therewith. Numerals 102 and 103 designate first and second electromagnetic pickups which are arranged and displaced from each other by a predetermined angle in the circumferential direction of the rotor 101 to oppose the projections on the rotor 101 and produce output voltages such as shown in (a) and (b) of FIG. 7 in response to the rotation of the rotor 101 caused by the rotation of the engine. A waveform shaping circuit is provided by NPN transistors 104 and 106 having their emitters respectively connected to the electromagnetic pickups 102 and 103 and their bases connected to the ground and resistors 105 and 107 respectively connected between the collectors of the transistors 104 and 105 and the battery 8 (shown in FIG. 5), and a pair of NAND circuits 108 and 109 constitute a flip-flop circuit having its one input connected to the collector of the transistor 104 and its other input connected to the collector of the transistor 106. Also, resistors 110 and 112 and an NPN transistor 111 constitute another waveform shaping circuit having its input connected to the electromagnetic pickup 103, and the operating level of the transistor 111 is preset to a level L shown in (b) of FIG. 7. In addition, a differentiation trigger generating circuit is provided by a capacitor 113 connected to the collector of the transistor 111, a resistor 114 and a diode 115.

Next, the charge/discharge control circuit 202 comprises a charge control circuit 202-1, a discharge control circuit 202-2 and a pressure sensor 6 mounted in the intake pipe of the engine for sensing the intake negative pressure. The pressure sensor 6 comprises a bridge composed of strain gage resistors 6-1, 6-2, 6-3 and 6-4, whereby the potential difference of the bridge is varied with variation of the negative pressure. The charge control circuit 202-1 is connected to the pressure sensor 6 and it comprises input resistors 202-1-1 and 202-1-2, a feedback resistor 202-1-3, a differential amplifier 201-1-4, a resistor 202-1-5, a Zener diode 202-1-6, a diode 202-1-7 and dividing resistors 202-1-8 and 202-1-9. While the output of this charge control circuit 202-1 increases with increase in the intake negative pressure, the output corresponding to the higher pressure is held at a predetermined value by the Zener diode 202-1-6 and the output corresponding to the lower pressure is maintained at a divided potential determined by the dividing resistors 202-1-8 and 202-1-9, thus causing the output potential of the charge control circuit 202-1 to vary in accordance with the intake pipe negative pressure as shown in (a) of FIG. 8. The output potential of the charge control circuit 202-1 is always held lower than the reference potential $V_{ref}$. The discharge control circuit 202-2 comprises resistors 202-2-1 and 202-2-2 and its output potential is maintained at a predetermined potential higher than the reference potential $V_{ref}$.

With the construction described above, the operation of the system of this invention will now be described with reference to the signal waveform diagram of FIG. 7 and the vacuum advance characteristic diagram of FIG. 8. The flip-flop circuit of the angular position detector 1 (FIG. 6) produces rectangular pulses at its output (c) in synchronism with the rotation of the engine crankshaft which is not shown, namely, the output goes to the "1" level during the period between the angular positions $M_1$ to $M_2$ and to the "0" level during the period between the angular positions $M_2$ to $M_1$ as shown in (c) of FIG. 7 and it consists of two pulses of two periods per revolution of the engine. When the output of the flip-flop circuit goes to the "1" level, the analog switch 203 of the first computing circuit 200 is turned on. At this time, the output of the NOT circuit 201 goes to the "0" level turning the analog switch 204 off, while the output signal (f) of the AND circuit 214 goes to the "0" level as shown in (f) of FIG. 7 turning off the capacitor resetting analog switch 209, thus starting at the point of $M_1$ the charging of the capacitor 210 through the charge control circuit 202-1 from the reference potential $V_{ref}$ as shown in (d) of FIG. 7. When the capacitor 210 is charged, the output (d) of the operational amplifier 208 becomes higher than the reference potential $V_{ref}$ and the output ($d_1$) of the comparison circuit goes to the "0" level.

Figure 7:
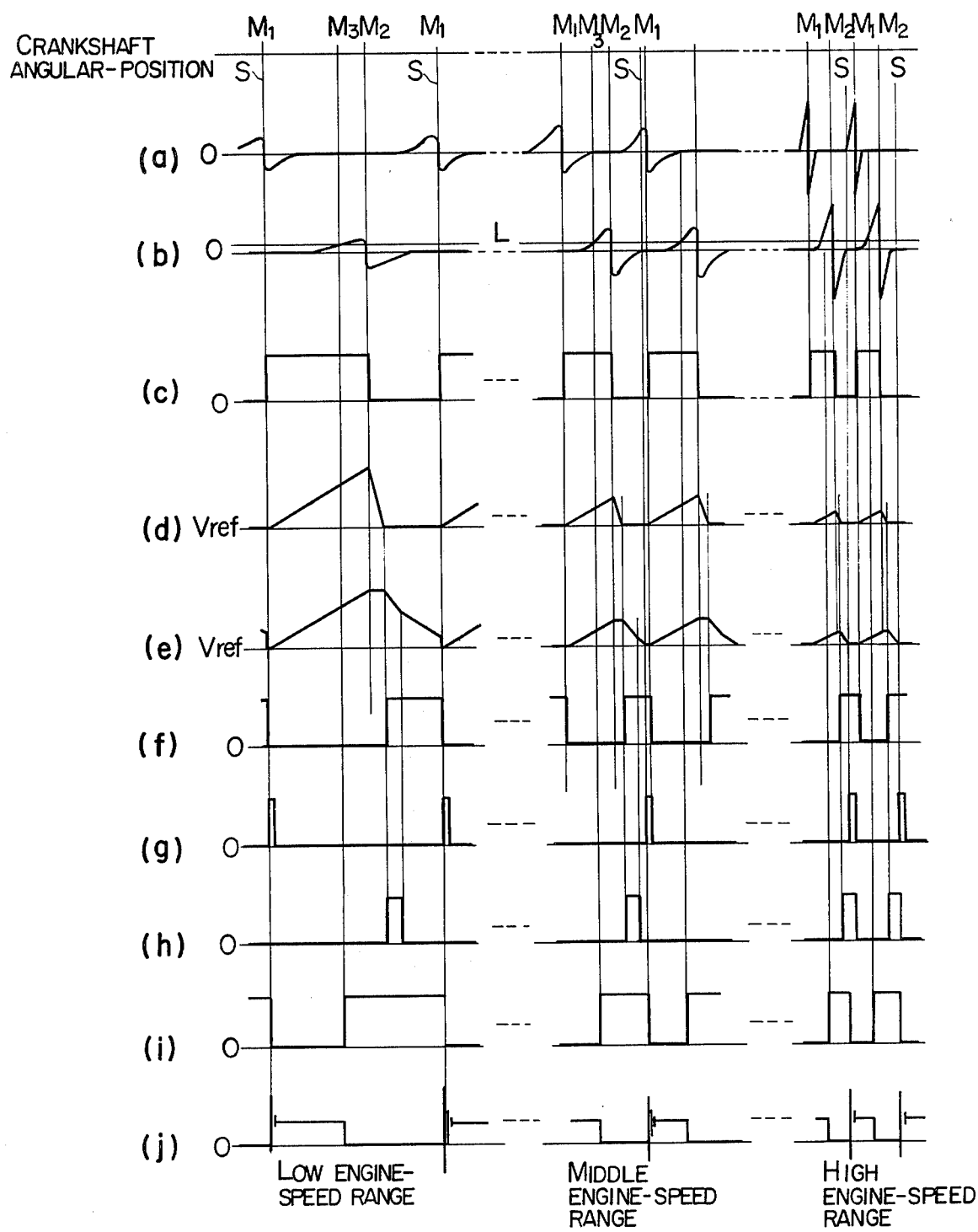
FIG. 7 shows in (a) through (j) a plurality of signal waveforms useful for explaining the operation of the system shown in FIGS. 5 and 6.

Then, when the output signal (c) of the angular position detector 1 goes to the "0" level at the point of the angular position $M_2$, the analog switch 203 is turned off and simultaneously the analog switch 204 is turned on, thus causing the capacitor 210 to start discharging through the discharge control circuit 202-2 as shown in (d) of FIG. 7. When the capacitor 210 completes its discharge, the output (d) of the differential amplifier 208 becomes lower than the reference potential $V_{ref}$ so that the output ($d_1$) of the comparison circuit is changed to the "1" level and the output (f) of the AND circuit 214 goes the "1" level as shown in (f) of FIG. 7, thus turning the analog switch 209 on and thereby maintaining the output (d) of the differential amplifier 208 constant at the reference potential $V_{ref}$ as shown in (d) of FIG. 7.

Referring now to the second computing circuit 300, it is substantially the same in construction with the first computing circuit 200 but the input to the analog switch 314 is the output of the first computing circuit 200 and the input to the analog switch 312 is the output of the second monostable circuit shown in (h) of FIG. 7, with the result that the capacitor 319 is charged through the charge control circuit during the period between the angular positions $M_1$ and $M_2$ as shown in (e) of FIG. 7. Then, the analog switch 310 is turned off at $M_2$ and simultaneously the analog switches 312 and 314 are similarly turned off, thus maintaining the output (e) of the differential amplifier 317 at the potential attained at the point of $M_2$ as shown in (e) of FIG. 7. Then, as the output ($d_1$) of the first computing circuit 200 goes to the "1" level so that the analog switches 312 and 314 are turned on, the capacitor 319 is caused to start discharging through the two discharge control circuits and the output of the second computing circuit 300 is changed to the "1" level upon the completion of the discharge in a like manner as the first computing circuit 200. In this case, in the low engine-speed range, the discharge of the capacitor 319 cannot be completed before the point of $M_1$ as shown in the left portion of (e) of FIG. 7, the charge stored in the capacitor 319 is forcibly discharged by the output pulse (g) of the first monostable circuit shown in (g) of FIG. 7. On the other hand, in the low and middle engine-speed ranges, during a predetermined time $\tau$ when the output pulse (h) of the second monostable circuit shown in the left and middle portions of (h) of FIG. 7 goes to the "1" level, both the analog switches 312 and 314 are turned on thus increasing the amount of discharge and after the predetermined time period $\tau$ the analog switch 312 is turned off and the discharge curve becomes as shown by the broken line in the left and middle portions of (e) of FIG. 7. In the high engine-speed range, as shown in the right portion of (e) of FIG. 7, the discharge of the capacitor 319 is completed within the time when the output pulse (h) of the second monostable circuit remains at the "1" level and consequently the total discharge current of the capacitor 319 is the sum of the discharge currents of the two discharge control circuits. This termination point of the computation in the second computing circuit 300 becomes the ignition point S.

Next, the ignition timing characteristic of the above-mentioned embodiment will be described with reference to the operating waveform diagram of FIG. 3 and the previously mentioned equations (4) and (5). In the first computing circuit 200, the output voltage of the charge control circuit 202-1 varies in accordance with the negative pressure in the intake pipe as shown in (a) of FIG. 8 so that the charging current $i_1$ is varied as shown in (b) of FIG. 8, namely, it is represented as $i_1 = f(P)$ and the charging current is descreased with increase in the intake negative pressure P. On the other hand, since the output of the discharge control circuit 202-2 is fixed, the discharge current $i_2$ is given as $i_2 = k_2$ ($k_2$ is constant). Consequently, the spark advance angle $\alpha_1$ varies in accordance with the intake negative pressure P as shown in (c) of FIG. 8. In the second computing circuit 300, the output currents of the charge control circuit and the discharge control circuits are constant so that the charging current $i_3$ and the discharge currents $i_4$ and $i_5$ are respectively given as $i_3 = k_3$, $i_4 = k_4$ and $i_5 = k_5$ ($k_2$, $k_3$, $k_4$ and $k_5$ are constant). in the low engine-speed range where the discharge is not completed within the period between $M_2$ to $M_1$, the ignition occurs at the point of $M_1$ and consequently the ignition point or timing for low engine speeds lower than a predetermined engine speed is held constant. In the middle and high engine-speed ranges, the spark advance characteristics are given in accordance with the equations (4) and (5), as follows.

(I) In the engine-speed range of $\theta_2 > \theta_\tau$ $$\alpha = 180° - (1 + \frac{f(P)}{k_2} + \frac{k_3}{k_5}) \cdot \theta_a + (\frac{k_4}{k_5} - 1) \cdot 60 \cdot \tau \cdot n$$

(II) In the engine-speed range of $\theta_2 \leq \theta_\tau$ $$\alpha = 180° - (1 + \frac{f(P)}{k_2} + \frac{k_3}{k_4}) \cdot \theta_a$$

where $\alpha$ is positive.

Figure 9:
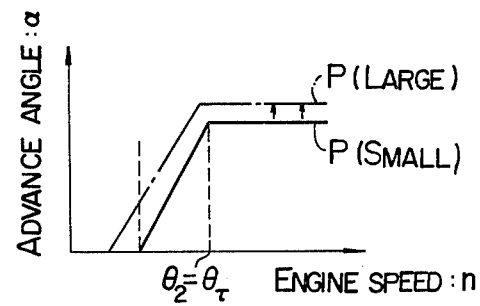
FIG. 9 is a characteristic diagram showing the spark advance characteristic in relation to the engine speed of the system shown in FIGS. 5 and 6.

In other words, as shown in FIG. 9, the spark advance characteristic in the high engine-speed range takes the form of a certain broken line characteristic according to the engine speed and the advance angle $\alpha$ is given by the sum of the intake vacuum advance angle $\alpha_1$ and the engine speed advance angle $\alpha_2$. Thus, the transistor 111 is turned on at the point of $M_3$ between $M_1$ and $M_2$ so that the flip-flop circuit of the primary winding control circuit 400 is set by the output differentiated pulse of the transistor 111 as shown in (i) of FIG. 7 and the primary winding of the ignition coil 3-1 of the ignition means 3 is energized at the point of $M_3$ as shown in (j) of FIG. 7. Then, the flip-flop circuit is reset at the discharge termination point of the second computing circuit 300 or the point S so that the current flow in the primary winding is interrupted and a high voltage is induced in the secondary winding of the ignition coil 3-1, thus producing an ignition spark at each of the spark plugs 3-3, 3-4, 3-5 and 3-6 through the distributor 3-2.

Figure 10:
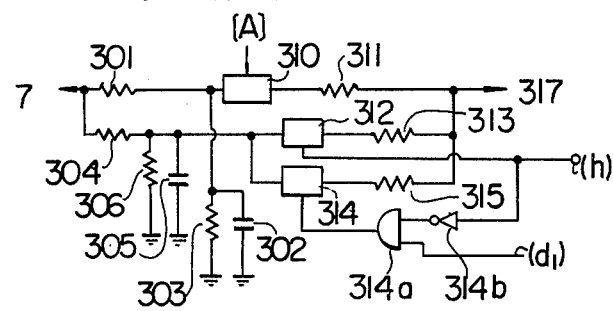
FIGS. 10, 11 and 12 are circuit diagrams showing the principal parts of another embodiment of the system according to the invention.

While, in the above-described embodiment, the discharge curve of the capacitor 319 is caused to take the form of a broken line by adding together the outputs of the plurality of discharge control circuits and causing only one of the discharge control circuits to operate, it is possible to cause the discharge curve of the capacitor 319 to become a broken line by setting the output current value of each of the discharge control circuits to a different predetermined value and operating these discharge control circuits in sequence. FIG. 10 shows another embodiment of this invention which is designed to achieve this object. In the embodiment of FIG. 10, only one set of the potential determining resistors 304 and 306 and capacitor 305 is used in common for the respective discharge control circuits and the current values of the individual discharge control circuits are changed by setting to different predetermined values the resistance values of the resistors 313 and 315 which are respectively connected through the analog switches 312 and 314 to the junction point of the resistors 304 and 306. The control terminals of the analog switches 310 and 312 are connected in a like manner as in FIG. 5, and the control terminal of the other analog switch 314 is connected to the output terminal of an AND circuit 314a whose one input terminal is connected to the output terminal (d₁) of the differential amplifier 213 shown in FIG. 5 and the other input terminal is connected through a NOT circuit 314b to the output terminal (h) of the AND circuit 335 shown in FIG. 5. In this way, the analog switch 312 is turned on in response to the output of the monostable circuit of FIG. 5 which is shown in (h) of FIG. 7 so that the capacitor 319 shown in FIG. 5 is discharged at a current value corresponding to the resistance value of the resistor 313, and at the same time that the output of the monostable circuit terminals after a predetermined time the analog switch 312 is turned off and the analog switch 314 is turned on through the NOT circuit 314b and the AND circuit 314a. Consequently, the capacitor 319 of FIG. 5 is discharged at another current value corresponding to the resistance value of the resistor 315.

Figure 11:
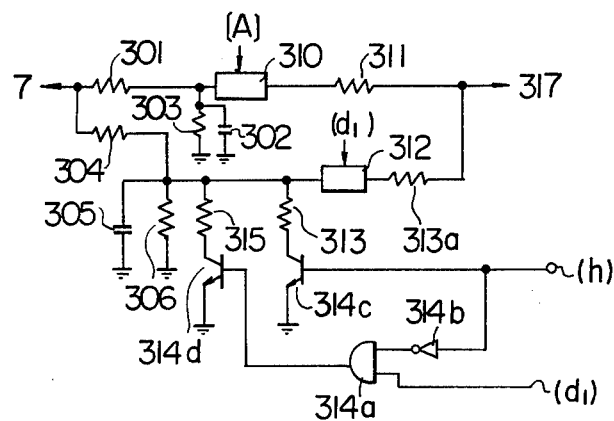

While, in the above-described embodiment of FIG. 10, the analog switches 312 and 314 are used to selectively insert the resistors 313 and 315 to directly control the current flow by the inserted resistor and thereby change the current values, the current values may be changed by arranging as shown in FIG. 11 in which transistors 314c and 314d are employed as analog switches and connected respectively through the resistors 313 and 315 to the junction point of the resistors 304 and 306 and the transistors 314c and 314d are turned on and off to change the potentials at the voltage dividing point and thereby change the current values. In this case, the analog switch 312 having its control electrode connected to the output terminal (d₁) of the differential amplifier 213 shown in FIG. 5, is connected between the voltage dividing point and a resistor 313a to prevent the output of the discharge control circuits from being supplied to the capacitor 319 shown in FIG. 5 except during the discharging periods.

Further, while, in the above-described embodiment, the minimum spark advance position is set at the top dead center, it is of course possible to set the minimum spark advance to any other given position before or after the top dead center depending on the specification of different engines.

Still further, while in the above-described embodiment, the charge starting point for the capacitors 210 and 319 is concurrent with the minimum spark advance position, any given angular position between M₂ and M₁ may be detected by another electromagnetic pickup which is not shown to select this detection point as the minimum spark advance position.

Figure 14:
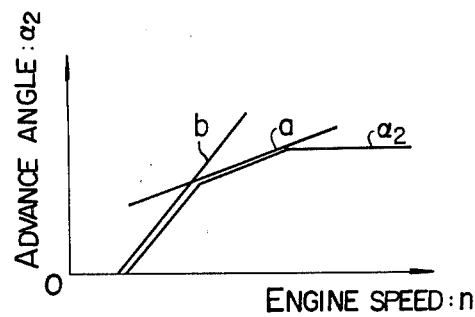
FIG. 14 is a characteristic diagram showing the spark advance characteristic in relation to the engine speed of the system shown in FIG. 12.

Still further, while, in the above-described embodiment, the engine speed is determined by means of a single monostable circuit and two discharge control circuits, the engine speed may be determined by means of two or more monostable circuits and three or more discharge control circuits so that the characteristic curve for the advance angle $\alpha_2$ in relation to the engine speed n becomes as shown by the multi-change broken line characteristic curve in FIG. 14, and consequently it is possible to obtain a more complicated spark advance characteristic as the numbers of monostable circuits and discharge control circuits are increased.

Figure 13:
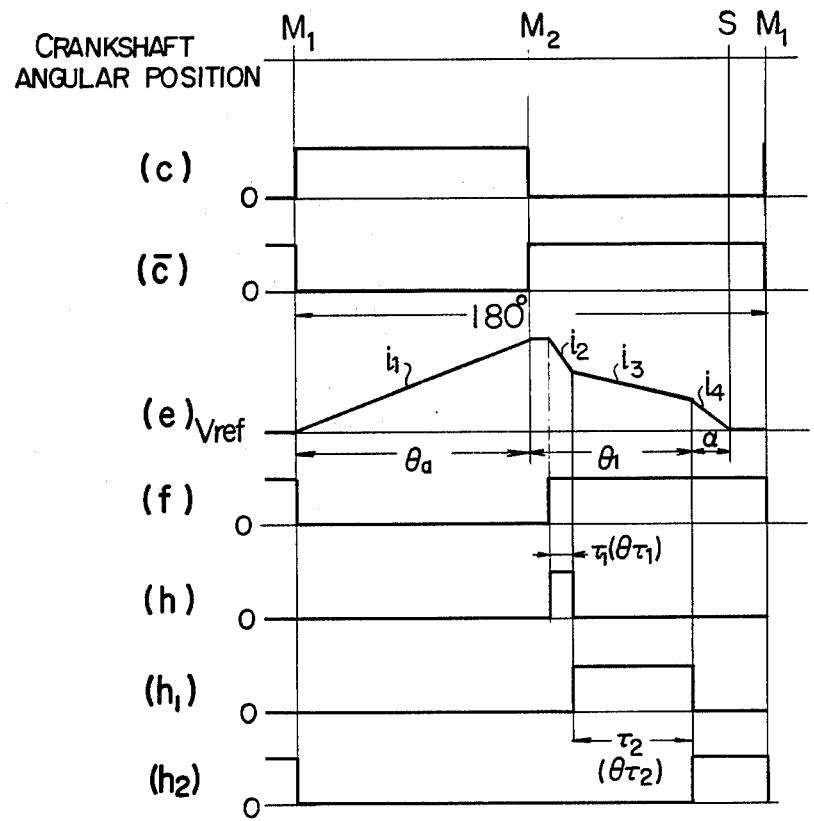
FIG. 13 is a signal waveform diagram useful for explaining the operation of the system shown in FIG. 12.
Figure 12:
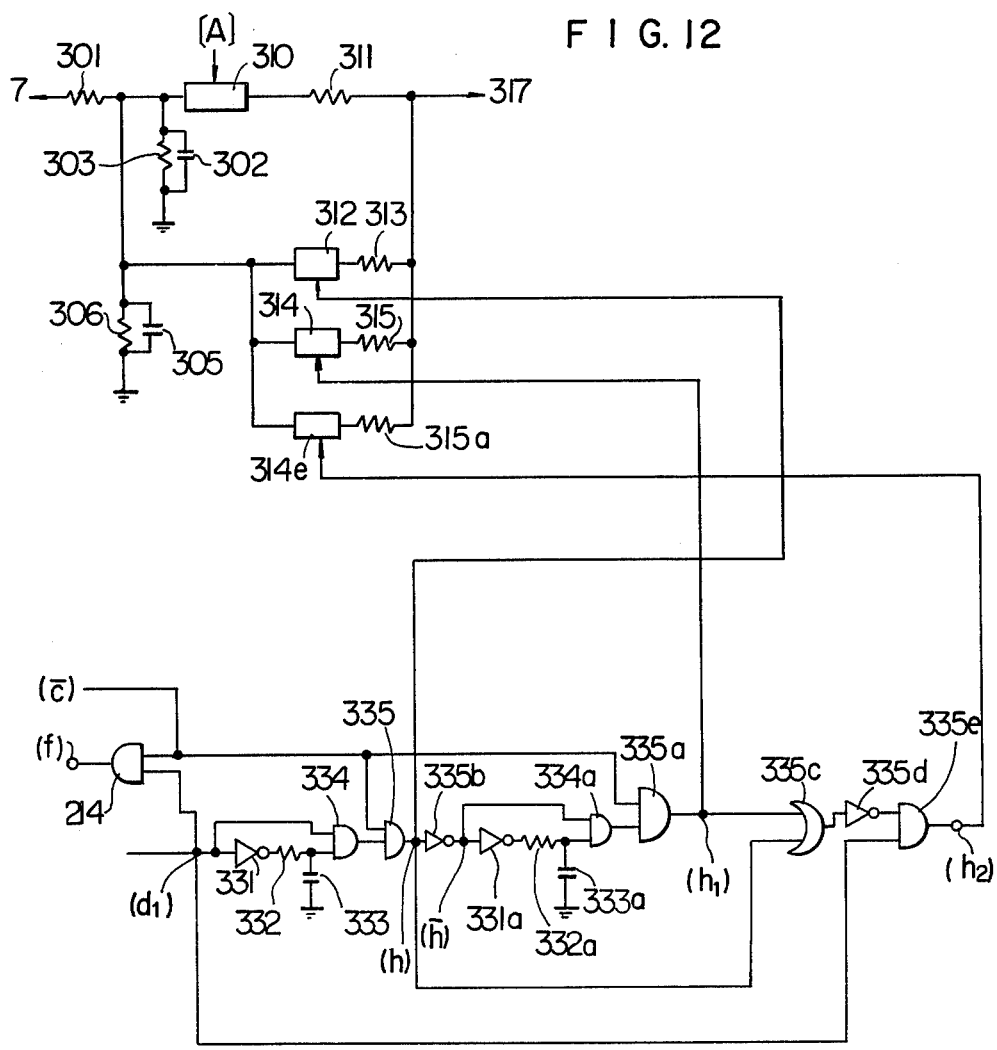

One embodiment of this type will now be described with reference to FIG. 12. In this embodiment, one of two monostable circuits has its output terminal (k) connected, through a NOT circuit 335b, in series with the other monostable circuit comprising a NOT circuit 331a, a resistor 332a, a capacitor 333a and AND circuits 334a and 335a, so that the analog switch 312 is turned on by the output (h) of the one monostable circuit having a predetermined time width $\tau_1$ as shown in (h) of FIG. 13 so as to discharge the capacitor 319 shown in FIG. 5 at a current shown by i₂ in (e) of FIG. 13, and upon the termination of the output (h) of the predetermined time width $\tau_1$ the analog switch 314 is turned on by the output (k₁) of the other monostable circuit having a predetermined time width $\tau_2$ as shown in (h₁) of FIG. 13 so as to discharge the capacitor 319 shown in FIG. 5 at a current shown by i₃ in (e) of FIG. 13. On the other hand, the other monostable circuit has its output (h₁) connected to one input terminal of an OR circuit 335c whose other input terminal is connected to the output terminal (h) of the AND circuit 335, and the output terminal of the OR circuit 335c is connected through a NOT circuit 335d to one input terminal of an AND circuit 335e having its other input terminal connected to the output terminal (d₁) of the differential amplifier 213 shown in FIG. 5 and its output terminal (h₂) connected to the control terminal of an analog switch 314e. Consequently, upon the termination of the output (h₁) of the other monostable circuit having the predetermined time width $\tau_2$ the AND circuit 335e produces an output (h₂) as shown in (h₂) of FIG. 13 so that the analog switch 314e is turned on and the capacitor 319 shown in FIG. 5 is discharged at a current shown by i₄ in (e) of FIG. 13 in accordance with the resistance value of a resistor 315a, thereby selecting the point of termination of the discharge as the desired ignition timing S. In FIG. 13, (c) shows the output signal of the angular position detector 1 shown in FIG. 6, (c̄) the output signal of the NOT circuit 201 shown in FIG. 5, (e) the charged voltage waveform of the capacitor 319 shown in FIG. 5, (f) the output signal of the AND circuit 214, and i₁ the charging current of the capacitor 319 through the charge control circuit. In FIG. 14, a straight line a is the tangent of an advance angle $\alpha_a$ which is dependent on the discharge current i₃ and given as $$\alpha_a = 60 \cdot \tau_1 \cdot (\frac{i_2}{i_3} - 1),$$

and a straight line b is the tangent of an advance angle $\alpha_b$ which is dependent on the discharge current i₄ and given as $$\alpha_b = 60 \cdot \tau_1 \cdot (\frac{i_2}{i_4} - 1) + 60 \cdot \tau_2 \cdot (\frac{i_3}{i_4} - 1).$$

Further, while, in the above-described embodiment, the minimum spark advance position is detected by the angular position detector 1 to prevent further retardation of the spark timing, by suitably selecting the set values of the final stage discharge control circuit and the final stage monostable circuit of the second computing circuit 300, it is possible to maintain the spark advance angle constant at engine speeds lower than a predetermined value.

Still further, while, in the above-described embodiment, the advance angle corresponding to the intake negative pressure is computed by the first computing circuit 200, it is possible to arrange so that the charging current of the first computing circuit 200 is changed in accordance with other engine condition such as the temperature of engine cooling temperature or the amount of exhaust gas through the exhaust gas recirculation unit. In this case, the sequence of computation by the first and second computing circuits 200 and 300 may be reversed and moreover a multi-stage computing system may be used in which such engine condition as engine cooling water temperature is computed by another computing circuit. Furthermore, since it is essential for the invention to comprise at least the second computing circuit 300 which computes the advance angle in accordance with the engine speed, it is not absolutely necessary to use the first computing circuit 200 which computes the advance angle in accordance with the intake negative pressure.

Figure 15:
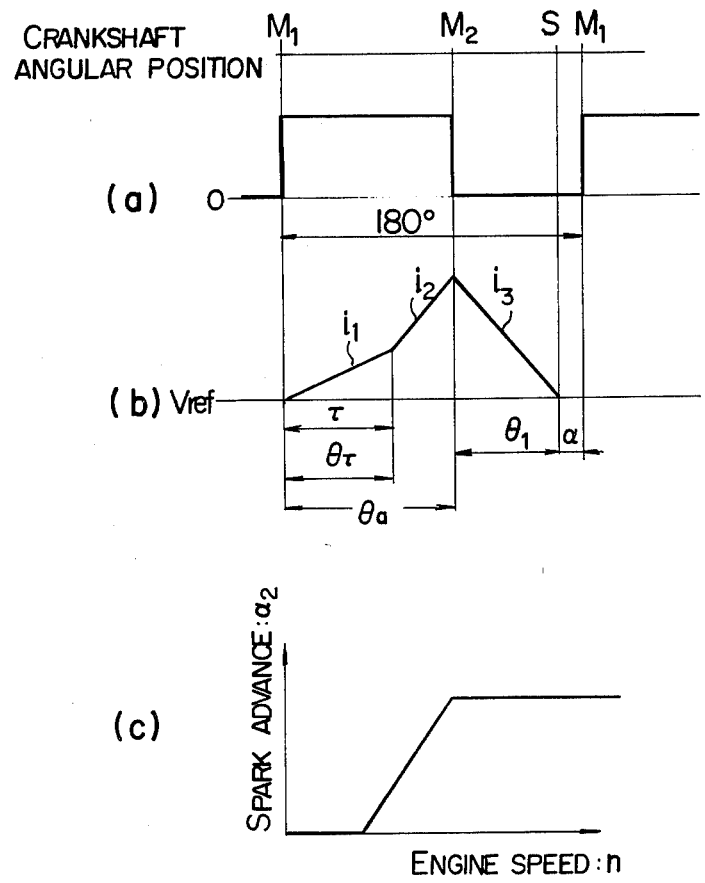
FIG. 15 shows a signal waveform diagram and an engine speed spark advance characteristic diagram of the system of this invention when another computing method is used.

Still further, while, in the above-described embodiment, the advance angle corresponding to the engine speed is computed in the discharge section, it is possible to compute the advance angle corresponding to the engine speed in the charging section as shown in FIG. 15. In the Figure, (a) shows the output signal waveform of the angular position detector, (b) the charged voltage waveform of the capacitor in the second computing circuit, $i_1$ and $i_2$ the charging currents different from each other, $i_3$ the discharging current, $\tau$ the predetermined time during which the capacitor is charged by the charging current $i_1$, $\theta\tau$ the angle of crankshaft rotation during which the capacitor is charged at the charging current $i_1$, $\theta_a$ the angle of crankshaft between the angular positions $M_1$ and $M_2$, $\theta_1$ the angle of crankshaft rotation during which the capacitor is discharged at the discharge current $i_3$, $\alpha$ the angle of spark advance, and (c) the angle of spark advance $\alpha_2$ in relation to the engine speed n. It is to be noted that FIG. 15 shows the case of a four-cycle, four-cylinder internal combustion engine. Thus, in this case the advance angle $\alpha$ is given by the following equation.

(I) In the low engine-speed range of $\theta_a > \theta\tau$ $$i_1 \cdot \theta\tau + i_2(\theta_a - \theta\tau) = i_3 \cdot \theta_1$$

$$\theta\tau = 60 \cdot \tau \cdot n$$

$$\alpha = 180° - (\theta_1 + \theta_a)$$

$$\therefore \alpha = 180° - (1 + i_2/i_3) \cdot \theta_a + 60/i_3 \cdot (i_2 - i_1)\tau \cdot n$$

(II) In the high engine-speed range of $\theta_a \leq \theta\tau$
$$i_1 \cdot \theta_a = i_3 \cdot \theta_1$$

$$\alpha = 180° - (\theta_1 + \theta_a)$$

$$\therefore \alpha = 180° - (1 + \frac{i_1}{i_3}) \cdot \theta_a$$

Still further, while, in the above-described embodiment, the angular position detector comprises electromagnetic pickups to accomplish the detection of crankshaft angular positions, the detection of crankshaft angular positions may be similarly effected by any photoelectric type or contact point type angular position detector.

Still further, while, in the above-described embodiment, the integrator circuits each including a capacitor are comprised of Miller integrator circuits, similar effects may be obtained by integrator circuits consisting of monostable circuits, ordinary RC integrator circuits, bootstraps or the like.

Figure 16:
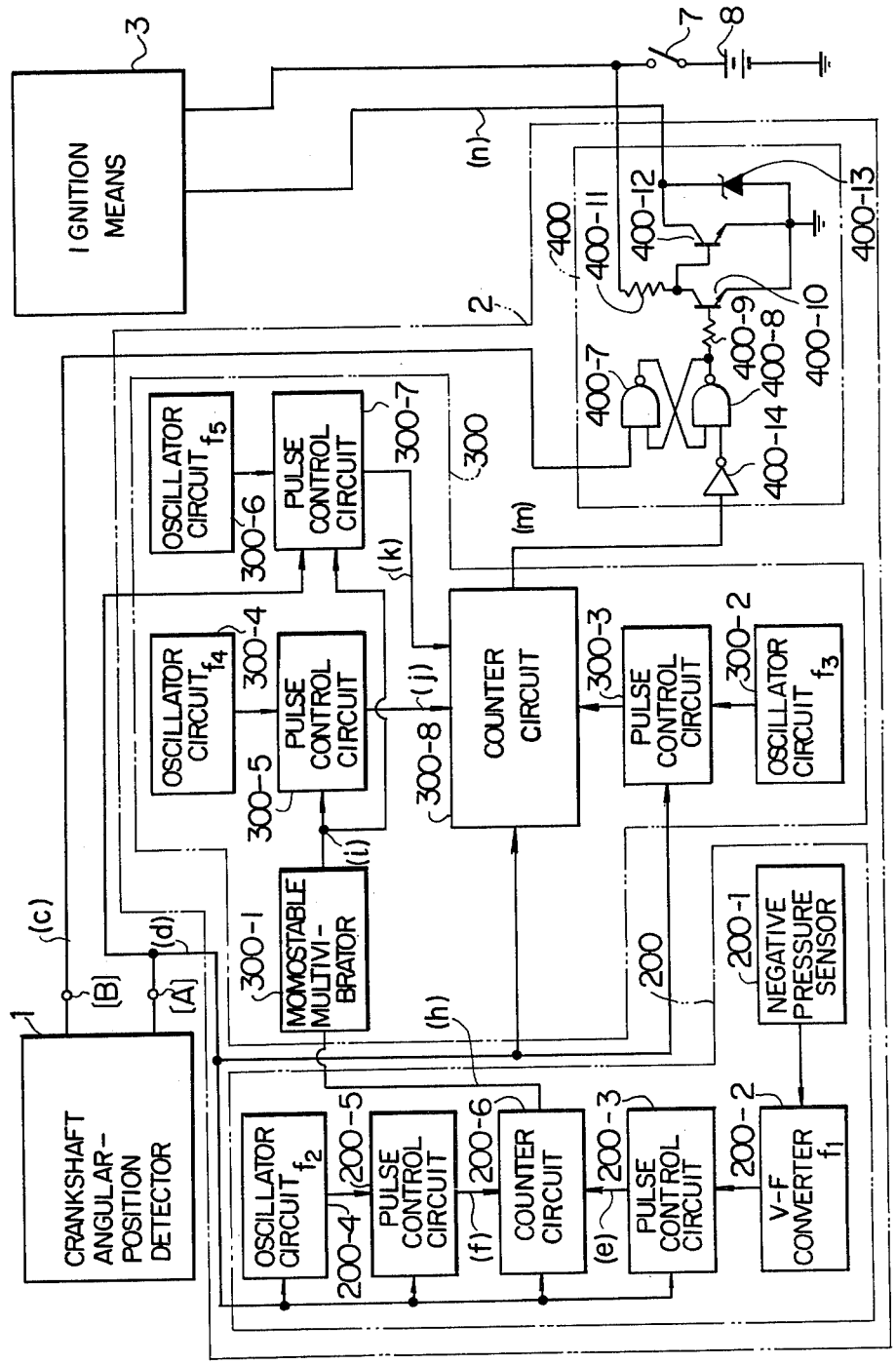
FIG. 16 is a block diagram showing still another embodiment of the system according to the invention.
Figure 17:
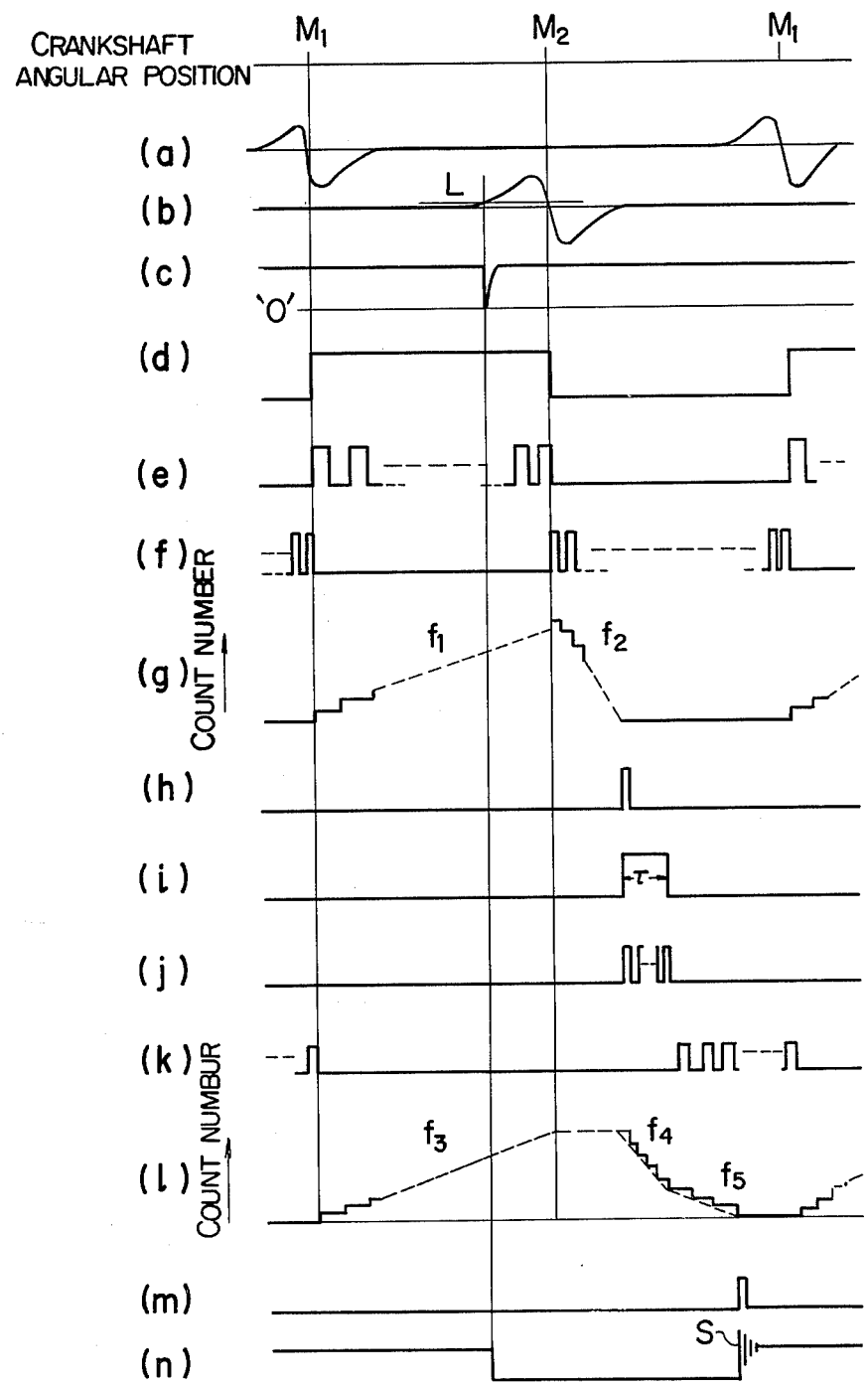
FIG. 17 is a time chart useful for explaining the operation of the system of this invention shown in FIG. 16.

Still further, while, in the above-described embodiment, the computation of ignition timing in the ignition timing computing circuit 2 is accomplished by a capacitor charging and discharging method, similar effects may be obtained through the digital computation of ignition timing. Namely, instead of effecting the computation in accordance with the amount of current flow to the capacitors, a computing method is used in which the computation is accomplished by counting pulses by counters and changing the frequency of the pulses in accordance with engine parameters. FIG. 16 is a block diagram showing another embodiment of the invention employing a digital computation method, and FIG. 17 shows a time chart for this embodiment.

In FIG. 16, the first computing circuit 200 of the ignition timing computing circuit 2 corresponds to the previously mentioned pressure sensor 6 and the charge control circuit 202-1 and it comprises a negative pressure sensor 200-1 for producing a voltage corresponding to the negative pressure in the intake pipe, a V-F converter 200-2 connected to the pressure sensor 200-1 for producing a frequency $f_1$ corresponding to the negative pressure, a pulse control circuit 200-3 connected to the V-F converter 200-2 and the crankshaft angular position detector 1 for passing the pulses of the frequency $f_1$ only during a time interval between the crankshaft angular positions $M_1$ and $M_2$, an oscillator circuit 200-4 for producing pulses having a predetermined frequency $f_2$, a pulse control circuit 200-5 connected to the oscillator circuit 200-4 and the angular position detector 1 for passing the pulses of the frequency $f_2$ only during a time interval between the angular positions $M_2$ and $M_1$ and a counter circuit 200-6 connected to the pulse control circuits 200-3 and 200-5 and the angular position detector 1 for counting up the output of the pulse control circuit 200-3 or the pulses of the frequency $f_1$ during the time interval between the angular positions $M_1$ and $M_2$ and counting down the output of the pulse control circuit 200-5 or the pulses of the frequency $f_2$ at the point of the angular position $M_2$ to produce a rising pulse upon the completion of the counting.

The second computing circuit 300 comprises a monostable circuit 300-1 connected to the counter circuit 200-6 for producing a pulse of a predetermined time width $\tau$ upon the completion of the down counting, an oscillator circuit 300-2 for producing pulses of a predetermined frequency $f_3$, a pulse control circuit 300-3 connected to the oscillator circuit 300-2 and the angular position detector 1 for passing the pulses of the frequency $f_3$ only during the time interval between the angular positions $M_1$ and $M_2$, an oscillator circuit 300-4 for producing pulses having a predetermined frequency $f_4$, a pulse control circuit 300-5 connected to the monostable circuit 300-1 and the oscillator circuit 300-4 for passing the pulses of the frequency $f_4$ only during the time that the pulse of the monostable time width $\tau$ is on, an oscillator circuit 300-6 for producing pulses of a predetermined frequency $f_5$, a pulse control circuit 300-7 connected to the oscillator circuit 300-6, the monostable circuit 300-1 and the angular position detector 1 for passing the pulses of the frequency $f_5$ only during the time interval between the negative-going transition of the pulse of the monostable time width $\tau$ and the point of the angular position $M_1$, and a counter circuit 300-8 connected to the pulse control circuits 300-3, 300-5 and 300-7 and the angular position detector 1 for counting up the output of the pulse control circuit 300-3 or the pulses of the frequency $f_3$ during the time interval between the angular positions $M_1$ and $M_2$, counting down the output of the pulse control circuit 300-5 or the pulses of the frequency $f_4$ during the duration of the monostable pulse width $\tau$ after the angular position $M_2$ and counting down the output of the pulse control circuit 300-7 or the pulses of the frequency $f_5$ from the point of the negative-going transition of the pulse of the monostable time width $\tau$ to thereby produce a rising pulse upon the completion of the counting.

The primary winding control circuit 400 comprises a flip-flop circuit connected to the angular position detector 1 and the second computing circuit 300 and including a NOT circuit 400-14 and NAND circuits 400-7 and 400-8, resistors 400-9 and 400-11, transistors 400-10 and 400-12 and a Zener diode 400-13.

Referring now to FIG. 17, the operation of this embodiment will be described. Firstly, as shown in (g) of FIG. 17, the counter circuit 200-6 counts up at the frequency $f_1$, (e) of FIG. 17, during the time interval between the angular positions $M_1$ and $M_2$ and then it starts counting down at the frequency $f_2$, (f) of FIG. 17, at the angular position $M_2$, thereby producing a signal (h) shown in (h) of FIG. 17 upon completion of the down counting. On the other hand, as shown in (l) of FIG. 17, the counter circuit 300-8 similarly counts up at the frequency $f_3$ during the time interval between the angular positions $M_1$ and $M_2$ and then it counts down at the frequency $f_4$, (j) of FIG. 17, during the duration of the monostable time width $\tau$ shown in (i) of FIG. 17. After the time width $\tau$ has terminated, the counter circuit 300-8 counts down at the frequency $f_5$, (k) of FIG. 17, and it produces a signal (m) shown in (m) of FIG. 17 upon completion of this counting. This output signal (m) and the output signal (c) of the angular position detector 1 shown in (c) of FIG. 17 are applied to the primary winding control circuit 400. Consequently, the flip-flop circuit comprising the NAND circuits 400-7 and 400-8 is set in response to the negative-going transition of the signal (c) and then it is reset in response to the positive-going transition of the signal (m), thus producing an ignition timing signal (n) as shown in (n) of FIG. 17 as the output of the current amplifying transistor 400-12 and thereby causing the ignition means 3 to spark in response to the positive-going transition of the signal (n) or the point S.

In this case, the count numbers attained by the counter circuits 200-6 and 300-8 during the time interval between the angular positions $M_1$ and $M_2$ are proportional to the frequencies $f_1$ to $f_5$ and thus the potentials across the capacitors correspond to the associated count numbers. Also the amount of current flow during the period of charging or discharging is proportional to the magnitude of the frequencies and thus the previously mentioned equations (1) to (5) for obtaining the desired spark advance angle are applicable by directly replacing the current values $i_1$ to $i_5$ with the frequency values $f_1$ to $f_5$. Thus, the original object of the invention can be equally attained with this embodiment.

Figure 8:
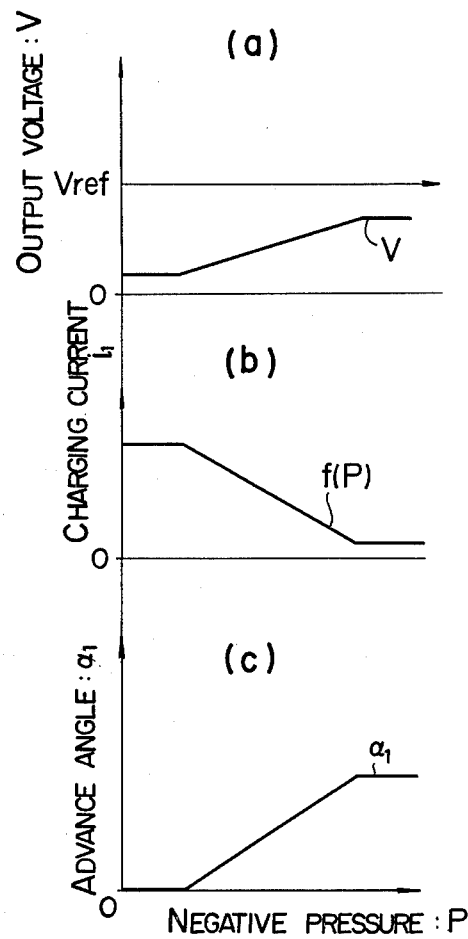
FIG. 8 is a characteristic diagram showing the spark advance characteristic in relation to the intake vacuum of the system shown in FIGS. 5 and 6.
Figure 18:
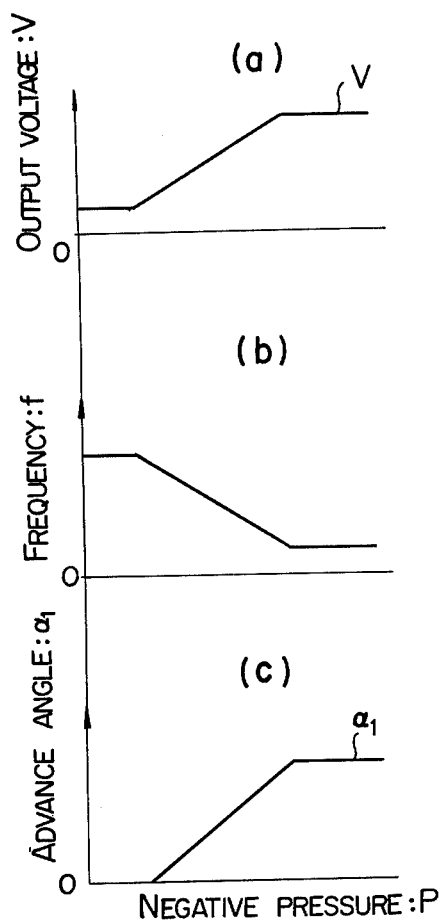
FIG. 18 is a characteristic diagram showing the spark advance characteristic in relation to the intake vacuum of the system shown in FIG. 16.
Figure 19:
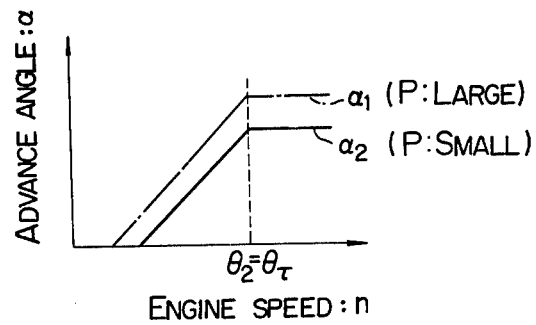
FIG. 19 is a characteristic diagram showing the spark advance characteristic in relation to the engine speed of the system shown in FIG. 16.

FIG. 18 corresponds to the characteristic diagram of FIG. 8 and it shows the relationship between the intake negative pressure P and the output voltage V, frequency f and advance angle $\alpha_1$. Also FIG. 19 corresponds to FIG. 9 and it shows the relationship between the engine speed n and the advance angle $\alpha$.

We claim:

1. In an ignition system for an internal combustion engine, an ignition timing control device for electronically controlling the timing of ignition of an internal combustion engine, comprising:

(a) angular position detecting means for detecting first and second different angular positions of a crankshaft of said engine to produce first and second detection signals corresponding to said first and second angular positions;

(b) a first integrator circuit having a first capacitor;

(c) a first charge/discharge control circuit connected to said angular position detecting means for charging said first capacitor at a predetermined current in response to said first detection signal from said angular position detecting means and discharging said first capacitor at a predetermined discharge current in response to said second detection signal;

(d) a timing circuit connected to said first integrator circuit for producing a timing signal of a predetermined time width when the potential across said first capacitor of said first integrator circuit is decreased to a predetermined value by said discharging, said timing circuit including a monostable circuit which produces said timing signal;

(e) a second integrator circuit having a second capacitor;

(f) a charge control circuit connected to said angular position detecting means and said second integrator circuit for charging said second capacitor at a predetermined current in response to said first detection signal from said angular position detecting means and stopping the charging of said second capacitor in response to said second detection signal;

(g) a discharge control circuit connected to said timing circuit and said second integrator circuit for discharging said second capacitor at a predetermined discharge current in response to said timing signal from said timing circuit and discharging said second capacitor at another current smaller than said discharge current in response to the termination of said timing signal; and (h) an ignition signal generating circuit connected to said second integrator circuit for producing an engine ignition timing signal in accordance with the output of said second integrator circuit.

2. A device according to claim 1, wherein said first charge/discharge control circuit includes a current control circuit for changing the flow rate of at least one of the charging current and the discharge current of said first capacitor in accordance with an engine parameter.

3. In an ignition system for an internal combustion engine, an ignition timing control device for electronically controlling the timing of ignition of an internal combustion engine, comprising:

(a) angular position detecting means for detecting first and second different angular positions of a crankshaft of said engine to produce first and second detection signals corresponding to said first and second angular positions;

(b) a first counter circuit for either counting up or counting down in accordance with an input signal;

(c) an up-down count control circuit connected to said angular position detecting means and said first counter circuit for applying pulse signals of a first predetermined frequency to said first counter for counting up in response to said first detection signal from said angular position detecting means, and then applying pulse signals of a second predetermined frequency to said first counter circuit for counting down in response to said second detection signal;

(d) a timing circuit connected to said first counter circuit for producing a timing signal of a predetermined time width when the count value of said first counter circuit is counted down to a predetermined value, said timing circuit including a monostable circuit which produces said timing signal;

(e) a second counter circuit for either counting up or counting down in accordance with an input signal;

(f) an up count control circuit connected to said angular position detecting means and said second counter circuit for applying pulse signals of a third predetermined frequency to said second counter circuit for counting up in response to said first detection signal from said angular position detecting means and stopping said up counting in response to said second detection signal;

(g) a down count control circuit connected to said timing circuit and said second counter circuit for applying pulse signals of a fourth predetermined frequency to said second counter circuit for counting down in response to said timing signal from said timing circuit and applying pulse signals of a fifth predetermined frequency lower than said fourth frequency to said second counter circuit for counting down in response to the termination of said timing signal; and (h) an ignition signal generating circuit connected to said second counter circuit for producing an engine ignition timing signal in accordance with the count value of said second counter circuit.

4. A device according to claim 3, wherein said first up-down count control circuit includes a frequency converter circuit for changing in accordance with an engine parameter the frequency of at least one of said pulse signals counted up by said first counter circuit and said pulse signals counted down by said first counter circuit.

* * * * *

UNITED STATES PATENT AND TRADEMARK OFFICE
CERTIFICATE OF CORRECTION

PATENT NO. : 4,201,163
DATED : May 6, 1980
INVENTOR(S) : Tadashi Hattori et al.

It is certified that error appears in the above—identified patent and that said Letters Patent is hereby corrected as shown below:

The attached columns 3 and 4 should be inserted as part of the above-identified patent.

This certificate applys exclusively to the Grant.

Signed and Sealed this

Twenty-eighth Day of October 1980

[SEAL]

Attest:

*Attesting Officer*

SIDNEY A. DIAMOND

*Commissioner of Patents and Trademarks* circuit. At the expiration of a predetermined time $\tau$ after the discharging of the second capacitor has been started, the discharging current is switched from $i_4$ to $i_5$ to continue the discharging and the time that the discharging is completed is selected as the desired ignition point S. Assuming now that the engine is a four-cylinder, four-cycle internal combustion engine, if the angle of crankshaft rotation from the angular position $M_1$ to the next angular position $M_1$ is selected 180 degrees, $\theta_a$ represents the angle of crankshaft rotation between the angular positions $M_1$ and $M_2$, $\theta_1$ represents the angle of crankshaft rotation corresponding to the discharging time of the first computing circuit, $\theta_2$ represents the angle of crankshaft rotation corresponding to the discharging time of the second computing circuit, $\theta_\tau$ represents the angle of crankshaft rotation during the predetermined time $\tau$, the first angular position $M_1$ corresponds to the top dead center at the end of the compression stroke of each cylinder, S represents the ignition point, and $\alpha$ represents the angle of crankshaft rotation between the positions $S_1$ and $M_1$ or the spark advance angle, the following relation holds between $\theta_\tau$ and $\tau$.

$$\theta_\tau/360 = \tau/(60/n)$$

and therefore $$\theta_\tau = \tau \times (n/60) \times 360 = 60 \cdot \tau \cdot n$$

where n is the engine rotational speed in rpm.

Then, the advance angle $\alpha$ can be computed as follows.

(I) When $\theta_2 > \theta_\tau$ $$i_1 \cdot \theta_a = i_2 \cdot \theta_1$$

and therefore $$\theta_1 = (i_1/i_2) \cdot \theta_a \quad (1)$$

$$\theta_\tau = 60 \cdot \tau \cdot n \quad (2)$$

also $$i_3 \cdot \theta_a = i_4 \cdot \theta_\tau + i_5 \cdot (\theta_2 - \theta_\tau)$$

$$\therefore \theta_2 = (i_3/i_5) \cdot \theta_a - (i_4/i_5) \theta_\tau \quad (3)$$

Therefore, from the above equations (1), (2) and (3), we obtain $$\alpha = 180° - (\theta_a + \theta_1 + \theta_2) \quad (4)$$

$$180° - (1 + \frac{i_1}{i_2} + \frac{i_3}{i_5})\theta_a + (\frac{i_4}{i_5} - 1) \cdot 60 \cdot \tau \cdot n$$

(II) When $\theta_2 \leq \theta_\tau$ $$\theta_2 = (i_3/i_4) \cdot \theta_a$$

$$\therefore \alpha = 180° - (1 + \frac{i_1}{i_2} + \frac{i_3}{i_4}) \cdot \theta_a \quad (5)$$

Consequently, the spark advance angle $\alpha$ can be represented in terms of the sum of the characteristics of the first and second computing circuits, so that if the charging and discharging currents of the first computing circuit are changed according to any parameter other than the engine speed, such as, intake pressure or cooling water temperature and the charging and discharging currents of the second computing circuit are predetermined, when $\theta_2 > \theta_\tau$ in accordance with the engine speed, the spark advance characteristic according to the equation (4) is obtained, whereas when $\theta_2 \leq \theta_\tau$, the spark advance characteristic according to the equation (5) is obtained. However, since, in the case of the spark advance characteristic according to the equation (4), the spark advance angle will be changed and the spark timing will be switched to a retarded condition as the engine rotational speed comes into the low-speed range, when the total sum of the spark advances provided by the first and second computing circuits becomes smaller than the minimum angle of spark advance, any further change in the total angle of spark advance is forcibly inhibited to maintain it at a fixed advance angle of a predetermined value.

The present invention will now be described in greater detail with reference to the illustrated embodiments.

Referring first to FIG. 4 illustrating a block diagram for an embodiment of the present invention, numeral 1 designates a crankshaft angular position detector for detecting two angular positions of the crankshaft of a four-cylinder, four-cycle internal combusting engine, 2 an ignition timing computing circuit, 200 a first computing circuit wherein a first capacitor is charged and discharged in accordance with a signal corresponding to an engine condition other than the engine speed and the signals from the crankshaft angular position detector 1 to thereby compute a spark advance angle, and in this embodiment this engine condition signal is an intake negative pressure signal. Numeral 300 designates a second computing circuit which is responsive to the output signals of the crankshaft angular position detector 1 and the first computing circuit 200 to charge and discharge a second capacitor and thereby compute a spark advance angle in relation to the engine speed. Numeral 400 designates a primary winding control circuit for controlling an ignition coil primary winding in accordance with the output signals of the crankshaft angular position detector 1 and the second computing circuit 300, 3 ignition means for switching on and off the flow of current in the ignition coil primary winding in accordance with the output signal of the primary winding control circuit and thereby causing spark plugs to produce spark in response to the interruption of the current flow in the primary winding.

Next, a detailed circuitry of the system of this invention constructed as described above, will be described with reference to FIG. 5. In the ignition timing computing circuit 2, a reference potential $V_{ref}$ is produced by resistors 2-1 and 2-2 and a capacitor 2-3 and it is coupled through bias resistors to operational amplifiers which will be described later. The first computing circuit 2 comprises a NOT circuit 201, a charge/discharge control circuit 202, analog switches 203, 204 and 209 each being adapted to be turned on in response to a "1" level signal, a charge resistor 205, a discharge resistor 206 bias resistors 207 and 212 connected to the reference potential $V_{ref}$, an input resistor 211, differential amplifiers 208 and 213, a capacitor 210 and an AND circuit 214. The resistors 205, 206 and 207, the capacitor and the differential amplifier 208 constitute a Miller integrator circuit whereby when the input voltage lower than the reference potential $V_{ref}$, the capaci-